(12) United States Patent
Ravn

(10) Patent No.: US 10,021,987 B2
(45) Date of Patent: Jul. 17, 2018

(54) DEVICE FOR HOLDING TWO OR MORE MONITORS AT AN OPERATOR CHAIR

(71) Applicant: Norsap AS, Kristiansand (NO)

(72) Inventor: Andreas Ravn, Oslo (NO)

(73) Assignee: Norsap AS, Kristiansand (NO)

(*) Notice: Subject to any disclaimer, the term of this patent is extended or adjusted under 35 U.S.C. 154(b) by 51 days.

(21) Appl. No.: 15/210,411

(22) Filed: Jul. 14, 2016

(65) Prior Publication Data

US 2017/0013964 A1   Jan. 19, 2017

(30) Foreign Application Priority Data

Jul. 17, 2015   (EP) .................................... 15177209

(51) Int. Cl.
*A47C 7/72*   (2006.01)
*B63B 49/00*   (2006.01)
(Continued)

(52) U.S. Cl.
CPC ............ *A47C 7/72* (2013.01); *A47B 21/0314* (2013.01); *B63B 49/00* (2013.01); *B64D 11/00153* (2014.12); *F16L 3/015* (2013.01); *F16M 11/121* (2013.01); *F16M 11/2014* (2013.01); *F16M 11/2085* (2013.01); *F16M 11/2092* (2013.01);
(Continued)

(58) Field of Classification Search
CPC .... A47C 7/62; A47C 7/68; A47C 7/72; B63B 49/00; A47B 21/0314; A47B 21/04; A47B 2021/0364; B64D 11/0015; B64D 11/00153; F16M 11/2014; F16M 11/2092; F16M 13/02; F16M 2200/063; Y10S 248/917; Y10S 248/919; Y10S 248/921
See application file for complete search history.

(56) References Cited

U.S. PATENT DOCUMENTS 7,246,780 B2 *   7/2007   Oddsen, Jr. ............ A47B 49/00
                                                                    211/26
8,596,599 B1 *   12/2013   Carson ................ B60R 11/0235
                                                                    211/26
(Continued)

FOREIGN PATENT DOCUMENTS

DE          19951307          4/2001
GB          2397999           8/2004
(Continued)

OTHER PUBLICATIONS

EPO Search Report, EP Patent Application No. 15177209.2, dated Feb. 2, 2016.

*Primary Examiner* — Ryan D Kwiecinski
(74) *Attorney, Agent, or Firm* — Andrus Intellectual Property Law, LLP

(57) ABSTRACT

A device is for holding two or more monitors at an operator chair. The device comprises an arm arrangement adapted to be shifted between different horizontal poses. The arm arrangement comprises a support structure, a first rocker arm, a second rocker arm and a third rocker arm that are rotatably attached at separate locations of the support structure via a respective first pivot, second pivot and third pivot. The support structure is adapted to be attached to or in vicinity of the operator chair. The arm arrangement further comprises a connection arrangement between the first rocker arm, the second rocker arm and the third rocker arm.

12 Claims, 8 Drawing Sheets

(51) Int. Cl.
  *B64D 11/00* (2006.01)
  *F16M 11/20* (2006.01)
  *F16M 13/02* (2006.01)
  *A47B 21/03* (2006.01)
  *F16L 3/015* (2006.01)
  *F16M 11/12* (2006.01)
  *B63B 29/04* (2006.01)
  *B63B 69/00* (2013.01)

(52) U.S. Cl.
  CPC ..... *F16M 13/02* (2013.01); *A47B 2021/0364* (2013.01); *B63B 69/00* (2013.01); *B63B 2029/043* (2013.01); *F16M 2200/063* (2013.01); *Y10S 248/921* (2013.01)

(56) References Cited

U.S. PATENT DOCUMENTS

| | | | | |
|---|---|---|---|---|
| 2002/0194792 | A1* | 12/2002 | Feldpausch | F16M 11/08 52/36.1 |
| 2003/0015632 | A1* | 1/2003 | Dunn | A47B 81/065 248/122.1 |
| 2003/0193817 | A1* | 10/2003 | Yoneda | G01L 311/00 362/555 |
| 2004/0031894 | A1* | 2/2004 | Smed | F16M 11/10 248/278.1 |
| 2004/0172887 | A1* | 9/2004 | Moglin | A47C 7/72 52/36.1 |
| 2005/0152102 | A1* | 7/2005 | Shin | F16M 11/10 361/679.29 |
| 2006/0226308 | A1* | 10/2006 | White | A61B 90/50 248/122.1 |
| 2011/0198460 | A1* | 8/2011 | Stifal | F16M 11/10 248/201 |
| 2011/0198467 | A1* | 8/2011 | Parraga Gimeno | F16M 11/121 248/284.1 |
| 2014/0117182 | A1* | 5/2014 | Blackburn | F16M 11/18 248/298.1 |
| 2014/0158647 | A1* | 6/2014 | Geier | F16M 11/048 211/26 |
| 2016/0120309 | A1* | 5/2016 | Brandt | F16M 11/10 361/679.01 |
| 2017/0085828 | A1* | 3/2017 | Shen | H04N 5/64 |

FOREIGN PATENT DOCUMENTS

| | | | |
|---|---|---|---|
| GB | 2407971 | 5/2005 | |
| JP | 2006133416 | 5/2006 | |
| WO | WO-2016090388 A1 * | 6/2016 | ......... F16M 11/2014 |

* cited by examiner

DEVICE FOR HOLDING TWO OR MORE MONITORS AT AN OPERATOR CHAIR

CROSS-REFERENCE TO RELATED APPLICATION

This application claims the benefit of and priority to European Patent Application No. 15177209.2, filed Jul. 17, 2015, incorporated herein by reference, in entirety.

FIELD

The present invention relates to a device for holding two or more monitors at an operator chair. The device comprises an arm arrangement adapted to be shifted between different horizontal poses. The invention further relates to a system for holding monitors at an operator chair and an operator chair arrangement comprising the system and the operator chair.

BACKGROUND

Control and surveillance of industrial processes are normally handled from a control room in which information of the process is displayed on a plurality of monitors to an operator. In the certain application, such as processes for offshore and maritime systems, it is desirable to mount the monitors in vicinity to an operator chair for holding the monitors at reading distance and within reach of the operator for enabling controlling of the process by means of a touch screen interface.

Combined with long working shifts where the operator has to be in a relaxed body posture, it is desirable to have the monitors mounted on the operator chair itself in order to comply with ergonomic requirements.

The device for holding monitors is often the component of the monitor chair that is subjected to the highest mechanical stress. Firstly, the monitors normally may be of significant size and weight. For example, monitors with a screen size of between 19" and 24" are commonly used and each monitor may have a weight over 10 kg. Furthermore, even if they are not normally intended to be used as such, the monitors may be used as handles by the operator in dynamic environments, such as on ships and etcetera.

Moreover, several monitors are usually needed to provide the operator with sufficient information of the industrial process. In a desirable configuration for offshore and maritime systems, two monitors are arranged on the front and to the left of the monitor chair and two monitors are arranged on the front and to the right of the monitor chair. This configuration allows the entire graphical user interface of the process to be displayed to the operator. A problem with the configuration is that the monitors hinder the operator from entering and exiting the operator chair in an easy manner. Furthermore, from ergonomic point of view the device should hold the monitors so that the content displayed there on is below eye height of the operator. Accordingly, the monitors are required to be arranged side by side and not on top of each other. A further requirement is that the most important information should be displayed with a +−45 degree angle of the viewing direction of the operator in order to limit the extent to which the operator have to move his eyes. The monitors should also be arranged so that they are directed towards the eyes of the operator in order to avoid glare on the screen of the monitors that reduces readability of information.

SUMMARY

The object of the invention is to provide an improved device for holding two or more monitors at an operator chair and to provide a remedy to or reduce at least one of the drawbacks of the prior art, or at least provide a useful alternative to prior art.

The object is achieved by means of a device for holding two or more monitors at an operator chair. The device comprises an arm arrangement adapted to be shifted between different horizontal poses. The device is characterized in that the arm arrangement comprises a support structure, a first rocker arm, a second rocker arm and a third rocker arm that are rotatably attached at separate locations of the support structure by means of a respective first, second and third pivot, which support structure is adapted to be attached to or in vicinity of the operator chair, wherein the arm arrangement further comprises a connection arrangement between the first, second and third rocker arms.

The support structure provides a framework for holding the arms of the arm arrangement. The support structure is adapted to be firmly attached to the operator chair or a stable structure in vicinity of the operator chair.

The first, second and third rocker arms are rotatably attached distributed along the support structure by mean of the first, second and third pivot. The first, second and third rocker arms are denoted 'rocker arms' in that they are attached to the support structure so that the available rotations by the first, second and third pivot are restricted to angles less than 180 degrees. The connection arrangement connects end portions of the first, second and third rocker arms together. Thereby the freedom of rotation of the first, second and third pivot are restricted by the configuration of the first, second and third rocker arms and the connection arrangement.

The device has the advantage that it provides a stable mechanism for holding the two or more monitors. In particular, the arm arrangement fulfils the requirements to be used in offshore and maritime systems, where the arm arrangement is subjected to conditions involving high stresses. Furthermore, the arm arrangement is adapted to be shifted between different horizontal poses by pushing or pulling the arm arrangement.

According to an embodiment of the invention, the connection arrangement comprises a first link arm connecting the first rocker arm and the second rocker arm and a second link arm connecting the second rocker arm and the third rocker arm.

The first and second link arms provide a connection between the first, second and third rocker arms. The length of the first and second link arm and their point of connection to the first, second and third rocker arms determine the relationship between the resulting rotation provided by the first, second and third pivots. Preferably, the first and second link arms are connected at an end portion of the first, second and third rocker arms.

According to an embodiment of the invention, the first link arm connects the first rocker arm and the second rocker arm by means of a fourth pivot and a fifth pivot arranged so that the fourth pivot is attaching the first link arm to the first rocker arm and the fifth pivot is attaching the first link arm to the second rocker arm, and wherein the second link arm connects the second rocker arm and the third rocker arm by means of said fifth pivot and a sixth pivot arranged so that the fifth pivot is attaching the second link arm to the second rocker arm and the sixth pivot is attaching the second link arm to the third rocker arm.

The fourth, fifth and sixth pivot has the function of rotatably attaching the first and second link arm to the respective first, second and third rocker arm. In particular, the fifth pivot provides a pivot between the first link arm, the second link arm and the second rocker arm. Preferably, the fourth, fifth and sixth pivot are arranged at an end portion of the first, second and third rocker arms.

According to an embodiment of the invention, the fifth pivot comprises a first pivot element rotatably attaching the first link arm to the second rocker arm and the second link arm, a second pivot element rotatably attaching the second link arm to the second rocker arm and the first link arm, and a third pivot element rotatably attaching the second rocker arm to the first link arm and the second link arm, wherein the first, second and third pivot elements are arranged at the same rotation axis and separated from each other along the rotation axis.

According to an embodiment of the invention, the fifth pivot provides a shared attachment for the first link arm and the second link arm to the second rocker arm.

According to an embodiment of the invention, the device comprises a respective monitor fixture for the two or more monitors, which monitor fixtures are attached to the arm arrangement for holding the two or more monitors in an upright position.

The monitor fixture has the function of holding the monitors in an upright position from the horizontal extending arm arrangement. The monitor fixture comprises means for being firmly attached to the arm arrangement.

According to an embodiment of the invention, the respective monitor fixture is attached to the connection arrangement. By attaching the monitor fixtures to the connection arrangement the monitors are arranged at a preferred distance from the operator.

According to an embodiment of the invention, the device is adapted to be arranged at or in vicinity of the operator chair so that the arm arrangement comprises an operational pose in which at least one of the monitors is positioned so that it at least partly blocks an operator from exiting the operator chair and a non-operational pose in which the two or more monitors are positioned forming a free exit path for the operator to exit the operator chair, wherein the arm arrangement is adapted to be shifted between the operational pose and the non-operational pose.

The operational pose of the arm arrangement provides a pose in which the monitors are positioned in a preferable positions for the operator in that at least one of the monitors are positioned close to the exit path. Likewise, the non-operational pose provides a pose in which the monitors are positioned in ergonomically preferable positions for the operator to enter and exit the operator chair in that the monitors are positioned to the side of the operator chair.

According to an embodiment of the invention, the arm arrangement is configured to be shifted between the operational and the non-operational pose by means of pushing or pulling one of the monitors.

According to an embodiment of the invention, the device is arranged so that in the operational pose a primary monitor is arranged at least partly within an angle of 45 degrees in respect to the direction of the exit path and a secondary monitor is arranged at least partly within an angle of 60 degrees in respect to the direction of the exit path.

The primary monitor is adapted to display information to the operator that is most important for the control of the industrial process. The secondary monitor is adapted to display information that is less frequently of importance for the control of the industrial process.

According to an embodiment of the invention, the device is arranged so that in the non-operational pose the two or more monitors are positioned at a side of the operator chair. Accordingly, the non-operational pose provides a free entrance and exit or an essentially free entrance and exit for the operator to/from the operator chair.

According to an embodiment of the invention, the device comprises a flexible cable carrier for holding one or more cables for the two or more monitors, which cable carrier is arranged extending on the outside of the pivots of the arm arrangement.

The arrangement of the cable carrier on the outside of the pivots has the advantage that the cable carrier and a corresponding cable is subjected to moderate bending when the arm arrangement is shifted between different poses. Accordingly, the occurrence of wear or damage to the cable due to repeated bending is reduced compared with prior art devices.

According to an embodiment of the invention, the cable carrier is arranged extending along the first rocker arm, the first link arm and at least partly along the second link arm.

According to an embodiment of the invention, the cable carrier is comprising a plurality of joints that enables the cable carrier to adjust as the arm arrangement is shifted between different poses.

According to an embodiment of the invention, the support structure comprises a first part and a second part that are adapted to be attached in an L-shaped configuration to or in vicinity of an elongated arm rest of the operator chair so that the first part of the support structure extends along a long side of the arm rest and the second part of the support structure extends along a short side of the arm rest, wherein the first pivot and second pivot are attached separated along said first part of the support structure and the third pivot is attached to said second part of the support structure.

The first and the second pivot are arranged on the first part of the support structure so that second pivot is located further away from the operator than the first pivot. The third pivot is arranged on the second part of the support structure so that the third pivot is arranged close to the exit path of the operator chair than the first and the second pivot. Accordingly, the support structure is adapted to be arranged at the operator chair so that the first part of the support structure extends parallel to an entrance of the operator chair and so that the second part extends in a direction vertical to the entrance of the operator chair. Accordingly, the support structure is formed comprising two separate parts connected in the L-shape configuration. This has the advantage that the weight of the arm arrangement is reduced compared to a support structure arranged as a single piece. Furthermore, the arm arrangement is adapted to be attached to different designs of operator chairs.

According to an embodiment of the invention, the support structure is L-shaped comprising a long side and a short side connected with each other, and where the support structure is adapted to be attached to or in vicinity of an elongated arm rest of the operator chair so that said long side of the support structure extends along a long side of the arm rest and said short side of the support structure extends along a short side of the arm rest, wherein the first and second pivot are attached separated along said long side of the support structure and the third pivot is attached to said short side of the support structure.

The support structure is formed as a single piece comprising the long side and the short side connected in the L-shape. The arrangement of the support structure as a single piece has the advantage that the support structure becomes more rigid as compared to if separated in different parts.

According to an embodiment of the invention, the first and second rocker arms are arms extending straight along an elongated axis.

The object of the invention is further achieved by means of a system for holding monitors at an operator chair. The system comprises a first and a second device, where the first device is arranged at a first side of the operator chair and the second device is arranged at a second side of the operator chair, and wherein the first and second side are opposite sides of the operator chair.

The system comprises the first and the second device that are arranged on a respective side of the operator chair. Thereby, the system enables two or more monitors to be arranged on each side of the operator chair.

The object of the invention is further achieved by means of an operator chair arrangement. The operator chair arrangement comprises a plurality of monitors and a system for holding monitors.

The operator chair arrangement comprises an operational mode in which the arm arrangement of the first and the second device is arranged in the operational pose. In the operational mode at least two of the monitors are at least partly blocking the exit path of the operator. The operator chair arrangement further comprises a non-operational mode in which the arm arrangement of the first and the second device is arranged in the non-operational pose. In the non-operational mode the monitors are positioned to the side of the monitor chair, thereby providing a free path for entrance or exit to/from the operator chair.

BRIEF DESCRIPTION OF THE DRAWINGS

In the following is described examples of preferred embodiments illustrated in the accompanying drawings, wherein:

FIG. 2b discloses a top view of the operator chair arrangement in FIG. 2a.

FIG. 3b discloses a top view of the operator chair arrangement in FIG. 3a.

DETAILED DESCRIPTION OF THE DRAWINGS

FIG. 1 discloses a prior art device for holding two monitors at an operator chair. The device comprises an arm arrangement comprising a first arm, a second arm and a pivot. The first and the second arm are rotatably connected to the same pivot from opposite direction. The first arm holds a first monitor and the second arm holds a second monitor.

Figure 1A:
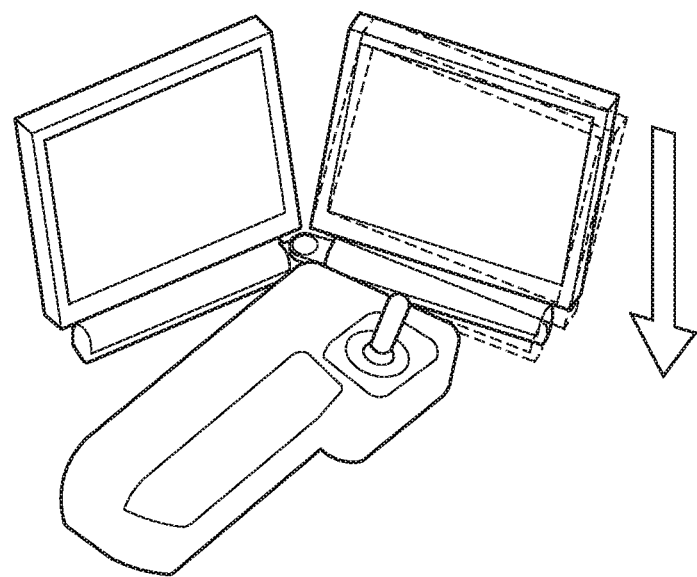
FIG. 1a discloses a schematic view of a prior art device for holding two monitors at an operator chair when the device is subjected to bending.
Figure 1B:
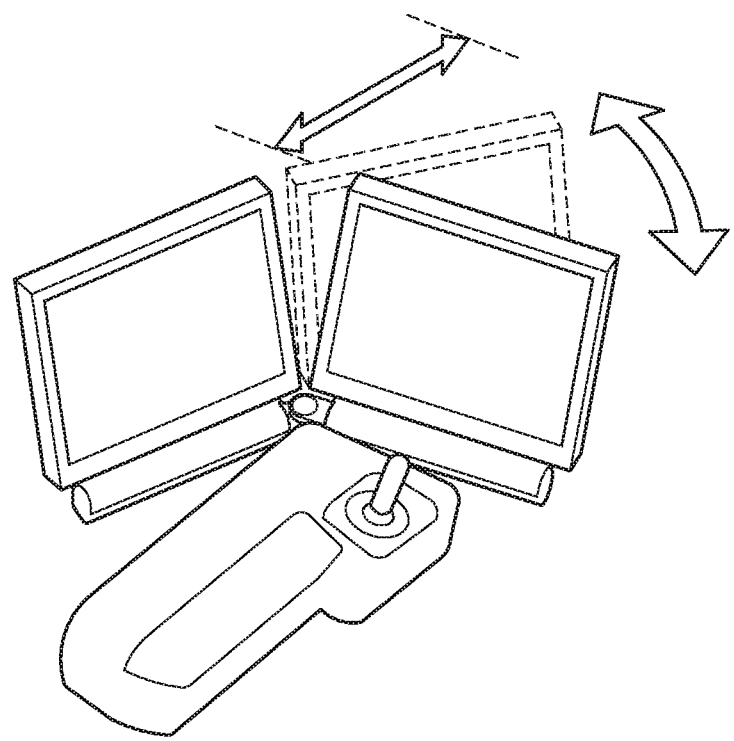
FIG. 1b discloses a schematic view of the prior art device in FIG. 1a when the device is rotated.

When the prior art device is subjected to bending, such as when an operator grabs the monitor in order to support himself, the pivots are subjected to high stress in that the arms act as levers in respect to the pivots, which may result in failure of the device, see FIG. 1a The prior art device is adapted to enable the first monitor to be rotated to open access for the operator to exit and enter the operator chair. However, the prior art devices have the disadvantage that when the operator chair is arranged in a small operator room, the first monitor may block an exit to the operator room, see FIG. 1b.

In FIGS. 2 and 3 discloses an operator chair arrangement 1 according to an embodiment of the invention. The operator chair arrangement 1 comprises an operator chair 3 in which an operator is adapted to be seated and a system 5 for holding a plurality of monitors 7a, 7b. The operator chair arrangement 1 is adapted to be used by an operator for controlling an industrial process, such as a process of an offshore or a maritime system.

The system 5 comprises a first device 10a and a second device 10b. The first device 10a is arranged on a first side 51 of the operator chair 3 and the second device 10b arranged on a second side S2 of the operator chair 3. In the present example, the first side 51 is the left side of the operation chair 3 and the second side S2 is the right side of the operator chair 3.

In the disclosed embodiment, each device 10a, 10b is adapted to hold two monitors 7a, 7b side by side. Accordingly, two of the monitors 7a, 7b are arranged on the left side of the operator chair 3 and two of the monitors 7a, 7b are arranged on the right side of the operator chair 3.

Each of the first device 10a and the second device 10b comprises an arm arrangement 12 that is adapted to be shifted between different horizontal poses. An example of the first device 10a will be explained in detail in connection to FIG. 4a-d.

Figure 2A:
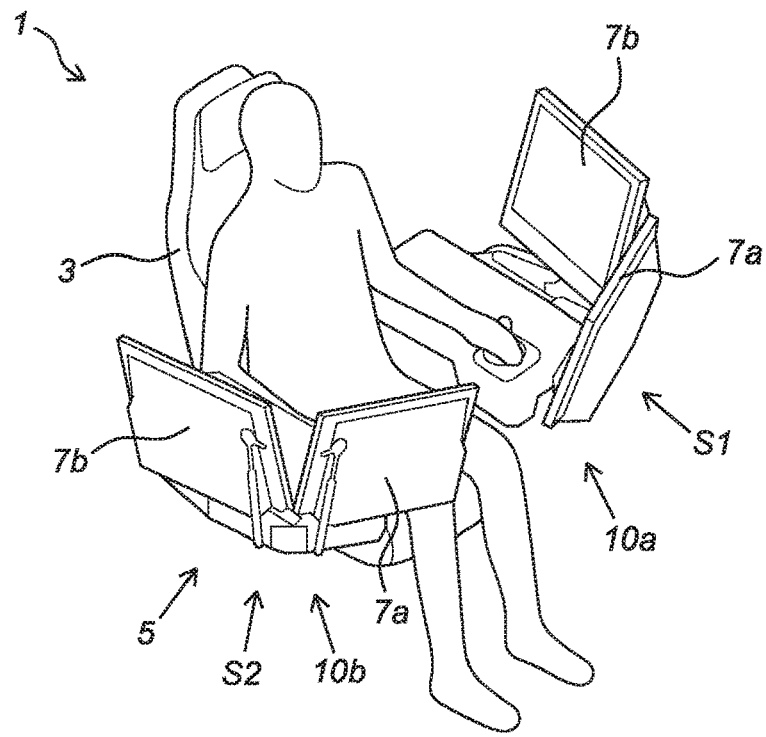
FIG. 2a discloses a perspective side view of an operator chair arrangement in an operation mode according to an embodiment of the invention.
Figure 2B:
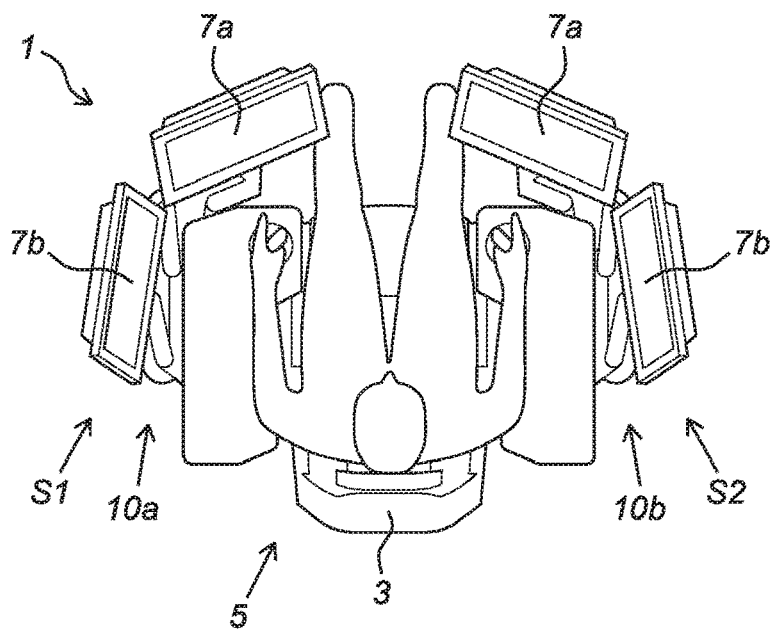
Figure 2C:
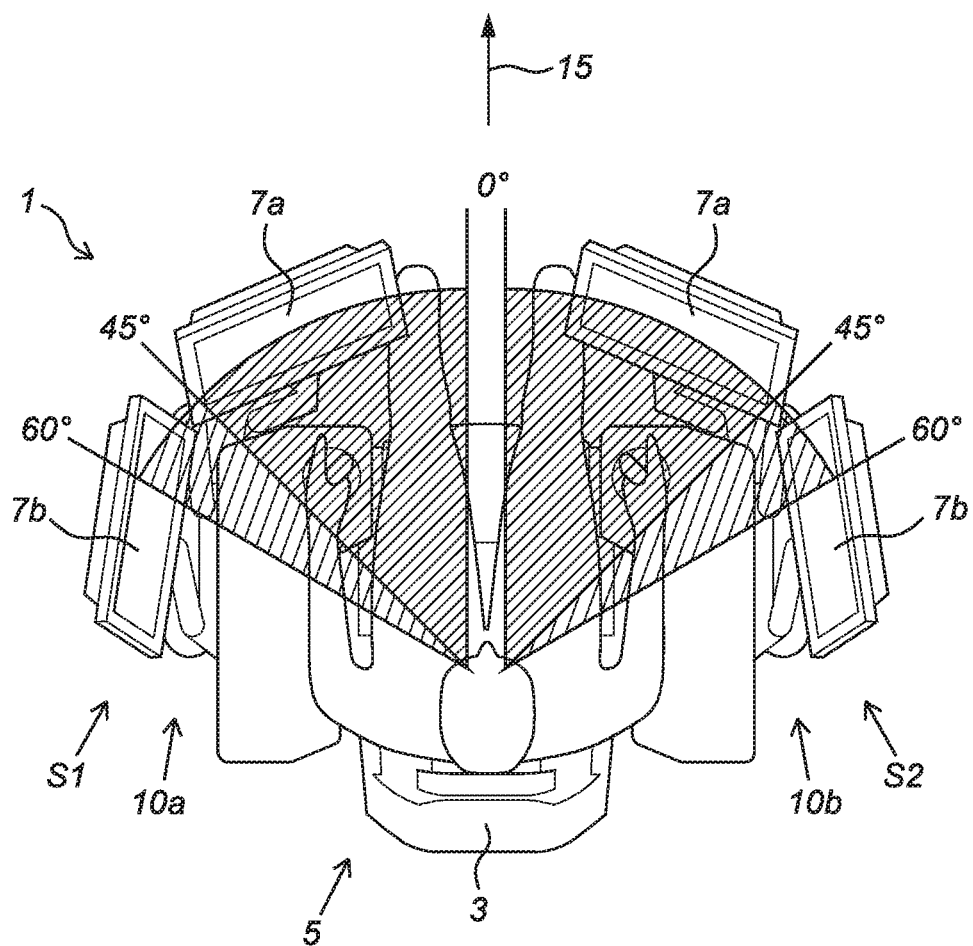
FIG. 2c discloses viewing angles of the monitors when the operator chair arrangement is in the operational mode.

The operator chair arrangement 1 comprises an operational mode in which the arm arrangement 12 of the first device 10a and the second device 10b are arranged in an operational pose. FIG. 2a-c discloses the operator chair arrangement 1 in the operational mode. In the operational mode the monitors 7a, 7b are positioned so that the operator ergonomically can view the monitors 7a, 7b.

With reference to FIG. 2c, the monitors 7a, 7b comprise a primary monitor 7a and a secondary monitor 7b. The primary monitor 7a is arranged within an angle of 45 degrees in respect to an exit path 15 of the operator chair 3. The secondary monitor 7b is arranged partly within an angle of 60 degrees in respect to the exit path 15 of the operator chair 3. The primary monitor 7a is used for displaying the most relevant information for the industrial process. The secondary monitor 7b is used for displaying information that is less relevant for the industrial process. In the operational mode the primary monitor 7a is partly blocking the exit path 15 for the operator.

Figure 3A:
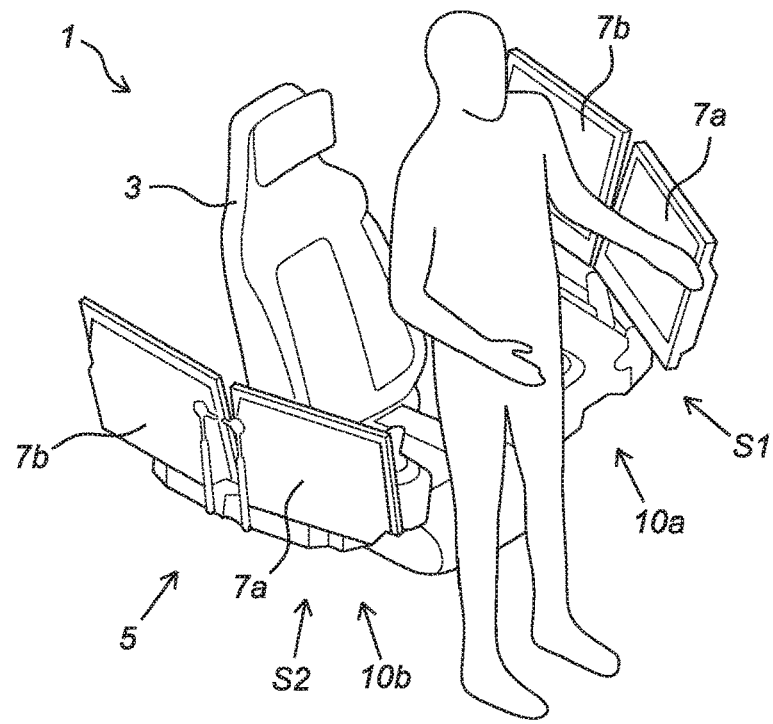
FIG. 3a discloses a perspective side view of the operator chair arrangement in FIG. 2 in a non-operation mode.
Figure 3B:
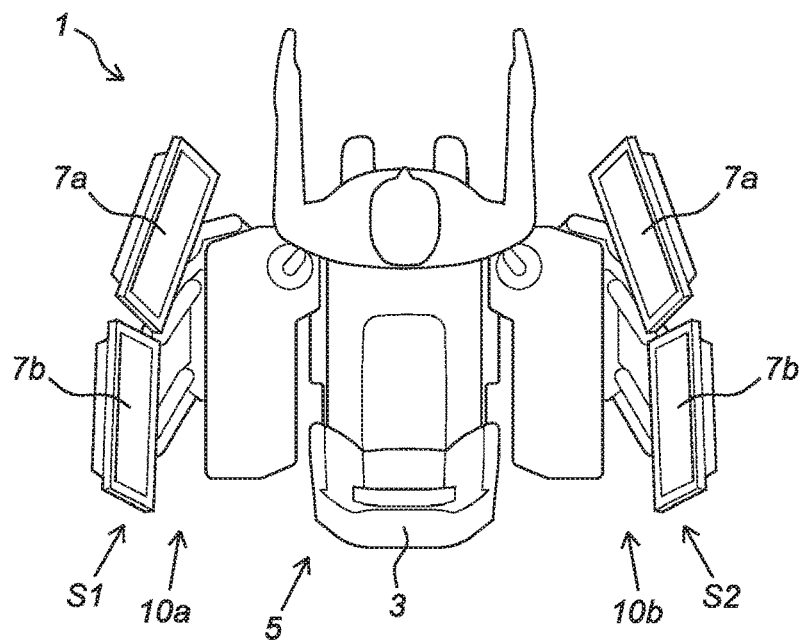

The operator chair arrangement 1 further comprises a non-operational mode in which the arm arrangement 12 of the first device 10a and the second device 10b are arranged in a non-operational pose. FIG. 3a-b discloses the operator chair arrangement 1 in the non-operational mode. In the non-operational mode the monitors 7a, 7b are positioned to the side of the operator chair 3 so to enable easy entrance and exit to/from the monitor chair 3 by means of an exit path 15.

It shall be understood that the monitors are also operative in the non-operational pose and positions between the operational pose and the non-operational pose. In particular, the use of the monitors in positions between the operational pose and the non-operational pose may be preferable in some situations, such as when the operator can view the industrial process directly through a front window and needs a better view directly of the industrial process. Accordingly, operator chair arrangement 1 comprises further a forward observing mode where at least one of the first device 10a and the second device 10b are arranged in positions between the operational pose and the non-operational pose.

Figure 4A:
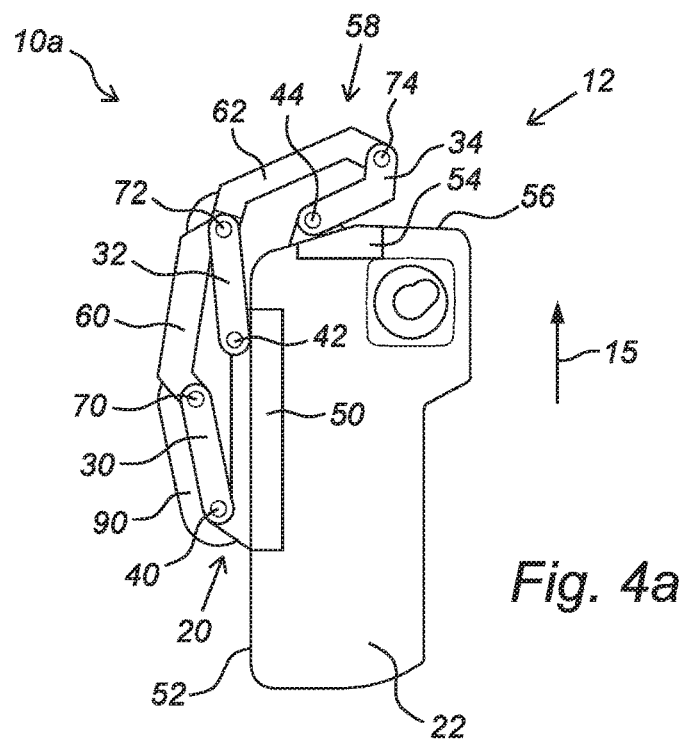
FIG. 4a-d discloses different views of a device for holding two or more monitors at an operator chair according to an embodiment of the invention.
Figure 4B:
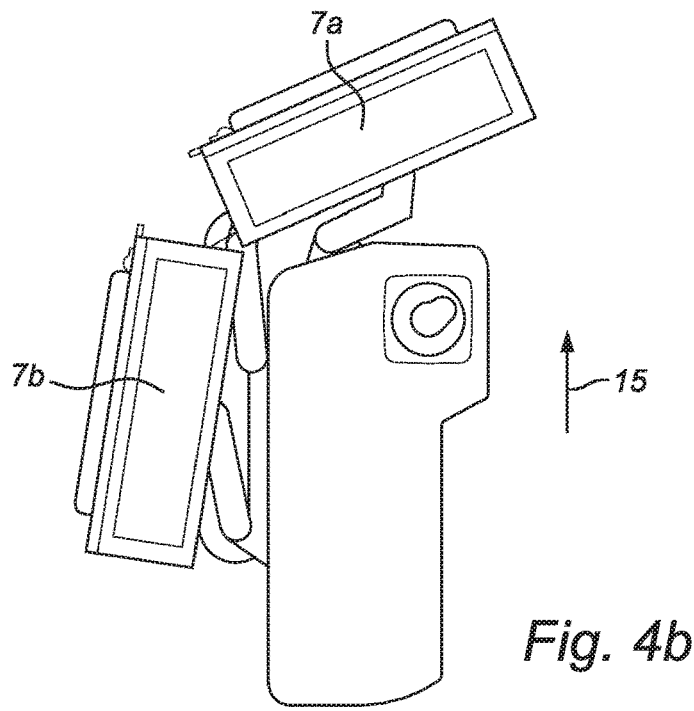
Figure 4C:
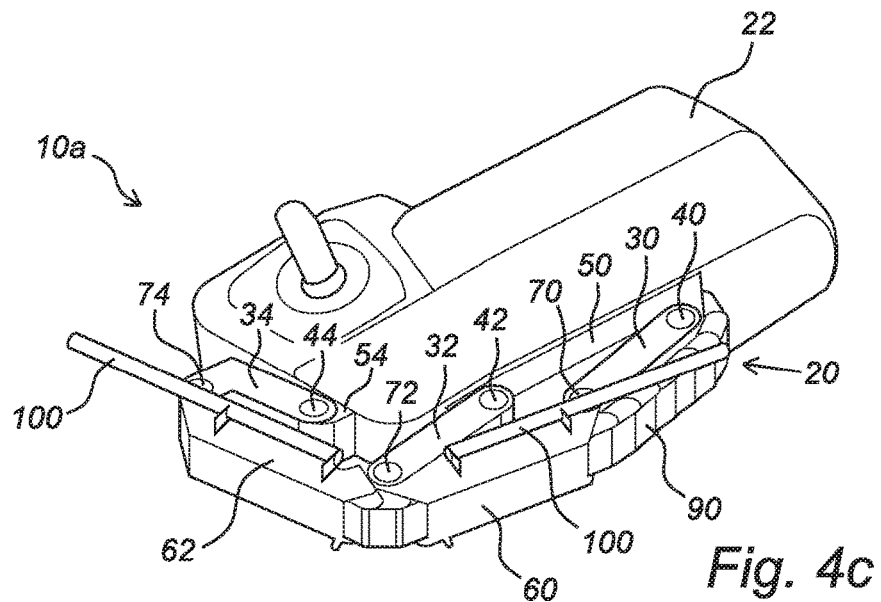
Figure 4D:
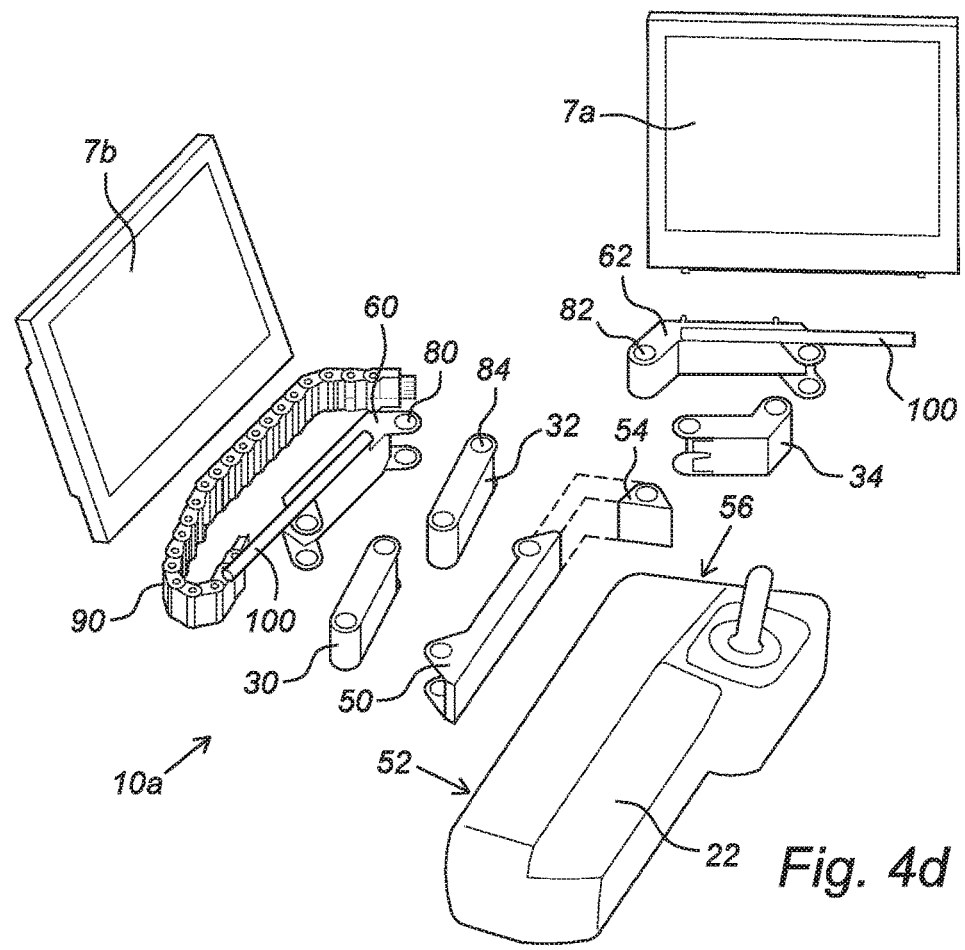

FIG. 4a-d discloses an example of the device 10a, 10b of the invention. In FIG. 4a and FIG. 4c, the device 10a, 10b is disclosed without the monitors 7a, 7b and in FIG. 4b and FIG. 4d with the monitors 7a, 7b attached. In FIG. 4c a perspective view of the device 10a, 10b is shown. In FIG. 4d an exploded view of the components of the device 10a, 10b is shown.

The device 10a, 10b comprises the arm arrangement 12 and a support structure 20 adapted to be attached to or in vicinity to an operator chair 3. In FIG. 4a-d only an elongated arm rest 22 of the operator chair 3 is disclosed to which the support structure 20 is attached.

The arm arrangement 12 comprises a first rocker arm 30, a second rocker arm 32, a third rocker arm 34 and a first pivot 40, a second pivot 42 and a third pivot 44. The first rocker arm 30, the second rocker arm 32 and the third rocker arm 34 are rotatably attached to the support structure 20 by means of the respective first pivot 40, second pivot 42 and third pivot 44. The first pivot 40, the second pivot 42 and the third pivot 44 are arranged at an end portion of the respective first rocker arm 30, second rocker arm 32 and third rocker arm 34.

In the disclosed example, the support structure 20 is attached to the arm rest 22 of the operator chair 3. The support structure 20 is attached in an L-shaped configuration to the arm rest 22. The support structure 20 comprises a first part 50 attached so that it extends along a long side 52 of the arm rest 22, see FIG. 4d. The support structure 20 further comprises a second part 54 attached so that it extends along a short side 56 of the arm rest 22. For example, the first part 50 and the second part 54 are brackets that are adapted to be attached in different parts of the arm rest 22.

When two devices 10a, 10b are attached to the operator chair 3, the second parts 54 of the support structures 20 of the first device 10a and the second device 10b are extending towards the exit path 15 from different sides of the operator chair 3.

The first pivot 40 and second pivot 42 are attached separated along the first part 50 of the support structure 20. The first pivot 40 is located closer to a seat of the operator chair 3 than the second pivot 42. The third pivot 44 is attached at the second part 54 of the support structure 20. The third pivot 44 is located closer to the exit path 15 of the operator chair 3 than the first pivot 40 and the second pivot 42.

The arm arrangement 12 further comprises a connection arrangement 58 between the first 30, second 32 and third rocker arm 34. The connection arrangement 58 comprises a first link arm 60 and a second link arm 62.

The first link arm 60 connects the first rocker arm 30 and second rocker arm 32 by means of a fourth pivot 70 and a fifth pivot 72. The fourth pivot 70 rotatably attaches the first rocker arm 30 with the first link arm 60. The fifth pivot 72 rotatably attaches the second rocker arm 32 with the first link arm 60. The fourth pivot 70 and fifth pivot 72 are arranged in an end portion of the respective first rocker arm 30 and second rocker arm 32. Likewise, the fourth pivot 70 and fifth pivot 72 are arranged in an end portion of the first link arm 60.

The second link arm 62 connects the second rocker arm 32 and third rocker arm 34 by means of the fifth pivot 72 and a sixth pivot 74. The fifth pivot 72 rotatably attaches the second rocker arm 32 with the second link arm 62. The sixth pivot 74 rotatably attaches the third rocker arm 34 with the second link arm 62. The fifth pivot 72 and sixth pivot 74 are arranged at an end portion of the respective second rocker arm 32 and third rocker arm 34. Likewise, the fifth pivot 72 and sixth pivot 74 are arranged in an end portion of the second link arm 62.

In the disclosed example, the fifth pivot 72 comprises a first pivot element 80, second pivot element 82 and third pivot element 84, see FIG. 4d. The first pivot element 80 is attaching the first link arm 60 to the second rocker arm 32 and the second link arm 62. The second pivot element 82 is attaching the second link arm 62 to the second rocker arm 32 and the first link arm 60. The third pivot element 84 is attaching the second rocker arm 32 to the first link arm 60 and the second link arm 62. The first, second and third pivot elements 80, 82, 84 are arranged at the same rotation axis and separated from each other along the rotation axis. Accordingly, a respective outer portion of the second rocker arm 32, the first link arm 60 and second link arm 62 are connected in the fifth pivot 72. The device 10a, 10b further comprises a respective monitor fixture 100 for holding the two monitors 7a, 7b in an upright position from the arm arrangement 12. The two monitor fixtures 100 are preferably attached so that the primary monitor 7a is arranged upright from the second link arm 62 and the secondary monitor 7b is arranged upright from the first link arm 60, see FIG. 4b.

The device 10a, 10b further comprises a flexible cable carrier 90 for holding one or more cables for the two monitors 7a, 7b. The cable carrier 90 is arranged extending outside the first pivot 40 and the along the first rocker arm 30, outside the fourth pivot 70 along the first link arm 60 and outside the fifth pivot 72 and at least partly along the second link arm 62, see FIG. 4c.

FIG. 5a-e discloses the movements of the arms 30, 32, 34, 60, 62 and pivots 40, 42, 44, 70, 72, 74 as the arm arrangement 12 is shifted between the operational pose and the non-operational pose.

Figure 5A:
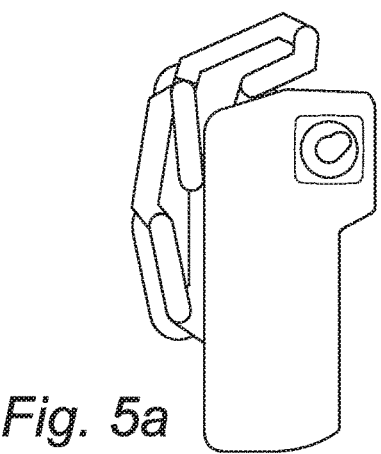
FIG. 5a-f discloses top views of different poses of an arm arrangement of the device in FIG. 4a-d, where FIG. 5a relates to an operational pose and FIG. 5f relates to a non-operational pose.

In FIG. 5a the arm arrangement 12 is in the operational pose. In FIG. 5e the arm arrangement 12 is in the non-operational pose.

In FIG. 5a the second rocker arm 32 is positioned rotated 5 degrees in respect to the support structure 20.

Figure 5B:
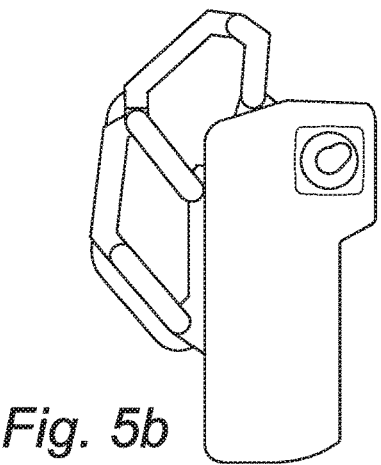

In FIG. 5b the second rocker arm 32 is positioned rotated 30 degrees in respect to the support structure 20.

Figure 5C:
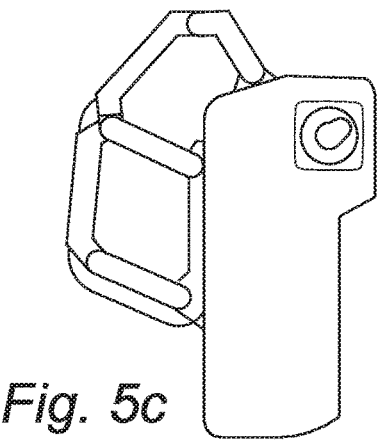

In FIG. 5c the second rocker arm 32 is positioned rotated 60 degrees in respect to the support structure 20.

Figure 5D:
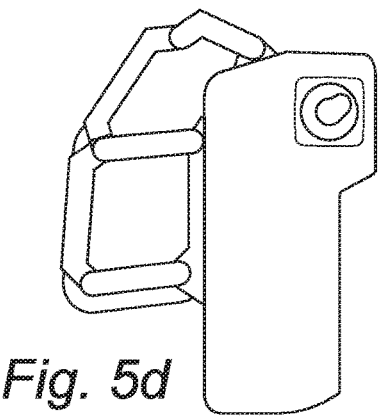
Figure 5E:
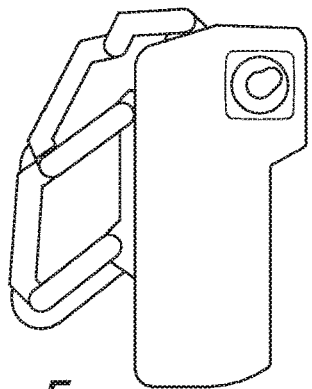
Figure 5F:
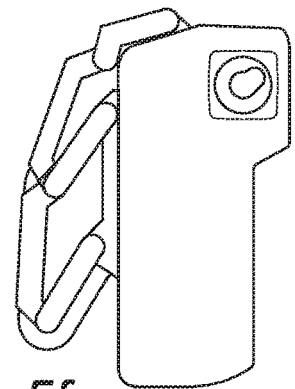

In FIG. 5d the second rocker arm 32 is positioned rotated 90 degrees in respect to the support structure 20.

In FIG. 5e the second rocker arm 32 is positioned rotated 120 degrees in respect to the support structure 20.

The arm arrangement 12 is adapted to be shifted between the operational pose and the non-operational pose by pushing or pulling the arm arrangement 12 or the monitors 7a, 7b. Thereby, the monitors 7a, 7b are rotated in an elliptical path or close to an elliptical path.

Figure 6A:
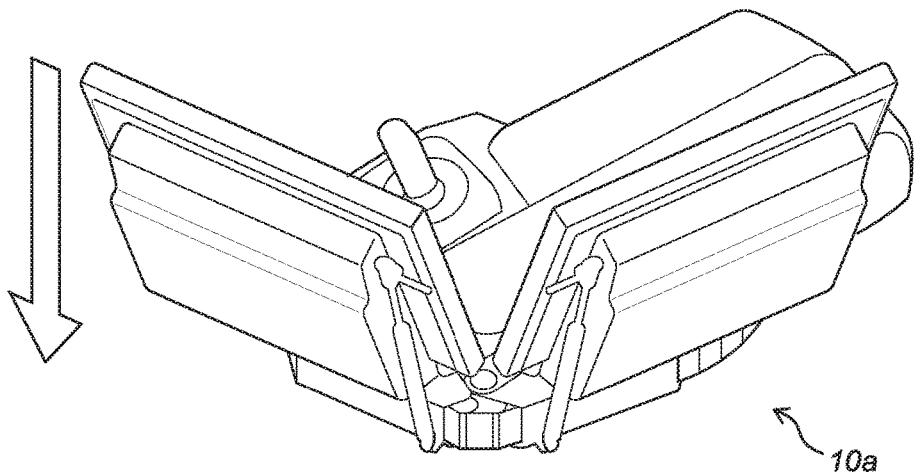
FIG. 6a-b discloses a schematic view on the improved stability of the device in FIG. 4a-d.
Figure 6B:
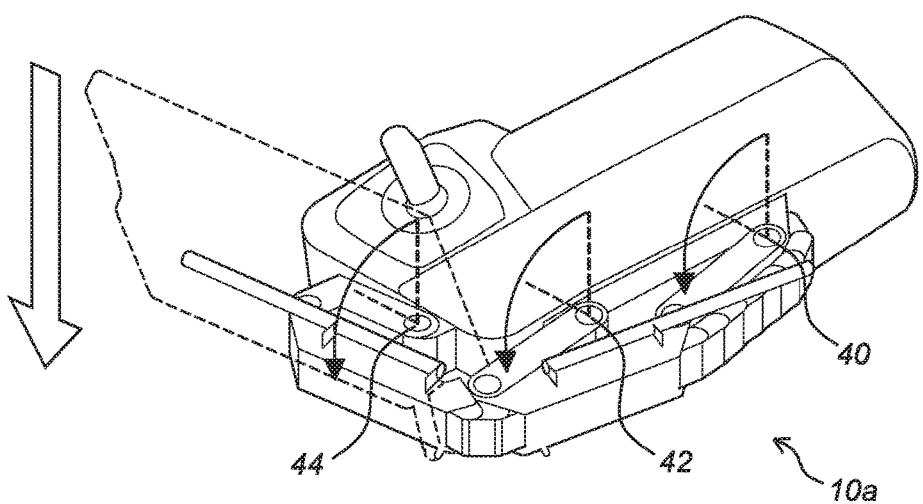

FIG. 6a-b discloses a schematic view on how the device 10a, 10b in FIG. 4a-d provides improved stability compared with prior art devices.

In the prior art, the monitors are attached through a single pivot, see FIG. 1a. With the available space, this pivot becomes weak when applying a vertical load on the edge of the monitors. This is a typical case when using them as handles to enter/exit, and as handle holds when the operator room is moving. This weakness is due to bending moment between the single pivot and the load, as there are not any other supports to arrest the moment. A good comparison is a shelf that is only fastened with one bracket to the wall. The bracket would have to be sufficiently large in order to handle the bending moment from a load as shown.

With the device 10a, 10b according to the embodiment in FIG. 4a-d, the load is supported by the first pivot 40, the second pivot 42 and the third pivot 44 attaching the first rocker arm 30, the second rocker arm 32 and the third rocker arm 34 to the support structure 20 and to an armrest body in which the support structure 20 is attached. The bending moment is distributed on these three pivots 40, 42, 44 in the same way the load is distributed for a shelf that is fastened with a three brackets. Thus, the device 10a, 10b according to the invention provides a rigid structure for holding two or more monitors 7a, 7b at an operator chair 3. The device 10a, 10b furthermore fulfils the ergonomic requirements for devices in offshore and maritime systems.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A device for holding two or more monitors at an operator chair, the device comprising: an arm arrangement adapted to be shifted between different horizontal poses, wherein the arm arrangement comprises a support structure, a first rocker arm, a second rocker arm and a third rocker arm, which first, second and third rocker arms are rotatably attached at separate locations of the support structure via a respective first pivot, second pivot and third pivot, which support structure is adapted to be attached to the operator chair, wherein the arm arrangement further comprises a connection arrangement between the first rocker arm, the second rocker arm and the third rocker arm, wherein the connection arrangement comprises a first link arm connecting the first rocker arm and the second rocker arm, and a second link arm connecting the second rocker arm and the third rocker arm, and wherein the first link arm connects the first rocker arm and the second rocker arm via a fourth pivot and a fifth pivot arranged so that the fourth pivot attaches the first link arm to the first rocker arm and the fifth pivot attaches the first link arm to the second rocker arm, and wherein the second link arm connects the second rocker arm and the third rocker arm by the fifth pivot and a sixth pivot arranged so that the fifth pivot attaches the second link arm to the second rocker arm and the sixth pivot attaches the second link arm to the third rocker arm.

2. The device according to claim 1, wherein the device comprises a respective monitor fixture for the two or more monitors, each respective monitor fixture being attached to the arm arrangement for holding the two or more monitors in an upright position.

3. The device according to claim 2, wherein each respective monitor fixtures is attached to the connection arrangement.

4. The device according to claim 1, wherein the device is adapted to be arranged at the operator chair so that the arm arrangement comprises an operational pose in which at least one of the two or more monitors is positioned to at least partly blocks an operator from exiting the operator chair and a non-operational pose in which the two or more monitors are positioned forming a free exit path for the operator to exit the operator chair, wherein the arm arrangement is adapted to be shifted between the operational pose and the non-operational pose.

5. The device according to claim 4, wherein the device is arranged so that in the operational pose a primary monitor is arranged at least partly within an angle of 45 degrees in respect to the direction of the free exit path and a secondary monitor is arranged at least partly within an angle of 60 degrees in respect to the direction of the free exit path.

6. The device according to claim 4, wherein the device is arranged so that in the non-operational pose the two or more monitors are positioned at a side of the operator chair.

7. The device according to claim 1, wherein the device comprises a flexible cable carrier for holding one or more cables for the two or more monitors, which flexible cable carrier is arranged extending on the outside of the first, second, third, fourth, fifth and sixth pivots of the arm arrangement.

8. The device according to claim 7, wherein the flexible cable carrier is arranged extending along the first rocker arm, the first link arm and at least partly along the second link arm.

9. The device according to claim 7, wherein the flexible cable carrier comprises a plurality of joints that enables the flexible cable carrier to adjust as the arm arrangement is shifted between different horizontal poses.

10. The device according to claim 1, wherein the support structure comprises a first part and a second part that are adapted to be attached in an L-shaped configuration to an elongated arm rest of the operator chair so that the first part of the support structure extends along a long side of the arm rest and the second part of the support structure extends along a short side of the arm rest, wherein the first pivot and second pivot are attached separated along the first part of the support structure and the third pivot is attached to the second part of the support structure.

11. The device according to claim 1, wherein the first rocker arm and the second rocker arm are arms extending straight along an elongated axis.

12. A device for holding two or more monitors at an operator chair, the device comprising: an arm arrangement adapted to be shifted between different horizontal poses, wherein the arm arrangement comprises a support structure, a first rocker arm, a second rocker arm and a third rocker arm, which first, second and third rocker arms are rotatably attached at separate locations of the support structure via a respective first pivot, second pivot and third pivot, which support structure is adapted to be attached to the operator chair, wherein the arm arrangement further comprises a connection arrangement between the first rocker arm, the second rocker arm and the third rocker arm, wherein the support structure comprises a first part and a second part that are adapted to be attached in an L-shaped configuration to an elongated arm rest of the operator chair so that the first part of the support structure extends along a long side of the arm rest and the second part of the support structure extends along a short side of the arm rest, and wherein the first pivot and second pivot are attached separated along the first part of the support structure and the third pivot is attached to the second part of the support structure.

* * * * *